(12) United States Patent
Hendrickson et al.

(10) Patent No.: US 7,869,685 B2
(45) Date of Patent: Jan. 11, 2011

(54) CONNECTOR COVER FOR PULLING AND WATER RESISTANCE

(75) Inventors: Daniel Hendrickson, Roswell, GA (US); Quentin Wayne Utz, Alpharetta, GA (US); Hongbo Zhang, Duluth, GA (US); Kelvin B. Bradley, Lawrenceville, GA (US)

(73) Assignee: OFS Fitel, LLC, Norcross, GA (US)

( * ) Notice: Subject to any disclaimer, the term of this patent is extended or adjusted under 35 U.S.C. 154(b) by 0 days.

(21) Appl. No.: 12/144,259

(22) Filed: Jun. 23, 2008

(65) Prior Publication Data
US 2008/0317415 A1 Dec. 25, 2008

Related U.S. Application Data

(60) Provisional application No. 60/945,670, filed on Jun. 22, 2007.

(51) Int. Cl.
*G02B 6/00* (2006.01)
(52) U.S. Cl. .................... 385/139; 385/136
(58) Field of Classification Search .......... 385/136, 385/139
See application file for complete search history.

(56) References Cited

U.S. PATENT DOCUMENTS

| | | | |
|---|---|---|---|
| 5,151,962 A * | 9/1992 | Walker et al. | 385/86 |
| 6,899,467 B2 * | 5/2005 | McDonald et al. | 385/78 |
| 7,044,650 B1 | 5/2006 | Tran et al. | |
| 7,090,406 B2 | 8/2006 | Melton et al. | |
| 7,150,567 B1 | 12/2006 | Luther et al. | |
| 7,160,156 B2 * | 1/2007 | Holliday | 439/879 |
| 7,330,624 B2 * | 2/2008 | Isenhour et al. | 385/134 |
| 2003/0063868 A1 * | 4/2003 | Fentress | 385/78 |
| 2008/0175548 A1 * | 7/2008 | Knecht et al. | 385/100 |
| 2008/0273855 A1 * | 11/2008 | Bradley et al. | 385/139 |
| 2009/0003793 A1 * | 1/2009 | Bell et al. | 385/139 |
| 2010/0202748 A1 * | 8/2010 | Pierce et al. | 385/136 |

* cited by examiner

*Primary Examiner*—Charlie Peng
(74) *Attorney, Agent, or Firm*—Michael A. Morra; Koji Noguchi (57) ABSTRACT

Embodiments of the invention include a connector system. The connector system includes a connector cover. The connector-cover has a cap to protect a connector from dust and water and an adapter attached to an optical fiber cable, which is configured to connect to the cap. The dimensions and configuration of the connector-cover allow it to be pulled through conventional conduit (i.e. a 90°-bent, 0.75 inch Schedule 40 conduit).

6 Claims, 8 Drawing Sheets

CONNECTOR COVER FOR PULLING AND WATER RESISTANCE

CROSS REFERENCE TO RELATED APPLICATIONS

This application claims the benefit of U.S. provisional patent application Ser. No. 60/945,670, filed Jun. 22, 2007, having the title "Connector Cover For Pulling and Water Resistance," which is incorporated herein by reference in its entirety.

TECHNICAL FIELD

The present invention relates to connectors, such as connectors use with optical fibers and more particularly to connector systems such as for Multi-Dwelling Units (MDU).

BACKGROUND OF THE INVENTION

There are a number of outside plant related connectors on the market within the optical cable field. Those outside plant related connectors achieve high water resistance and pull force requirements for outside use.

However, those connectors are an unnecessarily rugged for indoor use. Therefore there is a need for different type of connector systems which can pass through a wall for indoor use.

BRIEF DESCRIPTION OF THE DRAWINGS

Referring now to the drawings.

DETAILED DESCRIPTION

Network providers and customers often need factory terminated, environmentally-sealed, hardened connectors and adapters for use in drop-cable deployments in optical access networks. Also, network providers and customers often desire products that significantly reduce terminal and drop cable installation times and total deployment cost. The connectors which are used should be hardened to protect against extreme temperature, moisture, chemical exposure, and other harsh conditions typically found in outside plant environments.

Hardened connectors typically are used to connect multi-port terminals or fiber terminal closures, which usually are located at the street (e.g., in aerial configurations or in below-ground manholes), to Optical Network Terminals (ONTs), which usually are located at end user premises. During build-out, the connector system typically is mated to the external surface of the fiber terminal, so that connections can be completed without opening the enclosure, thus essentially creating a "plug and play" connection. When hardened connectors are deployed in a Multi-Dwelling Unit (MDU) application, the hardened connectors typically are fed into holes drilled into the exterior wall of a building for indoor use. Such holes typically are approximately 0.5 of an inch in diameter.

Several connector manufacturers and vendors offer hardened connectors and associated adapters for various applications, including Fiber-To-The-x (FITx) applications, such as Fiber-To-The-Premises (FTTP) or Fiber-To-The-Home (FMTH) applications. See, e.g., U.S. Pat. No. 7,090,406 and 7,150,567. Such connectors consist of an SC Connector plug enclosed in a pronged plug housing, fitted with two silicone O-rings. Upon insertion of the connector into the adapter (e.g., the adapter shown in U.S. Pat. No. 7,044,650), the O-rings are compressed against smooth walls within the adapter, to provide a water tight seal between the connector and adapter housing. The adapter uses a silicone O-ring to provide a water-tight seal against a panel or enclosure wall. Cable retention is achieved by sandwiching and bonding the cable's strength members within a two-piece crimp body and then crimping a metal crimp band into place over the crimp body. Heat-shrink tubing is used over the cable at the rear of the connector to prevent water from entering the plug housing.

Such connectors are among the most popular connectors currently available. However, the outside diameter of such connectors typically is approximately 0.80 of an inch, which can not be pulled through a 90° bend in 0.75 inch American National Standards Institute (ANSI) Schedule 40 conduit. Similarly, such connectors can not be inserted through the 0.5 of an inch diameter holes drilled in building walls, e.g., in MDU applications. Also, such connectors typically have a threaded coupling nut, which takes a relatively long time to screw into place compared to other alternatives, such as a push-pull configuration.

Accordingly, it would be desirable to have a connector system which requires less rugged outdoor cable with a connector that can pass through a wall for indoor use. The connector system should protect from pulling force, water and dust. Also, the connector system should be relatively small and low cost as a whole system.

In the following description like reference numerals indicate like components to enhance the understanding of the invention through the description of the drawings. Also, although specific features, configurations and arrangements are discussed herein below, it should be understood that such is done for illustrative purposes only. A person skilled in the relevant art will recognize that other steps, configurations and arrangements are useful without departing from the spirit and scope of the invention.

Figure 1:
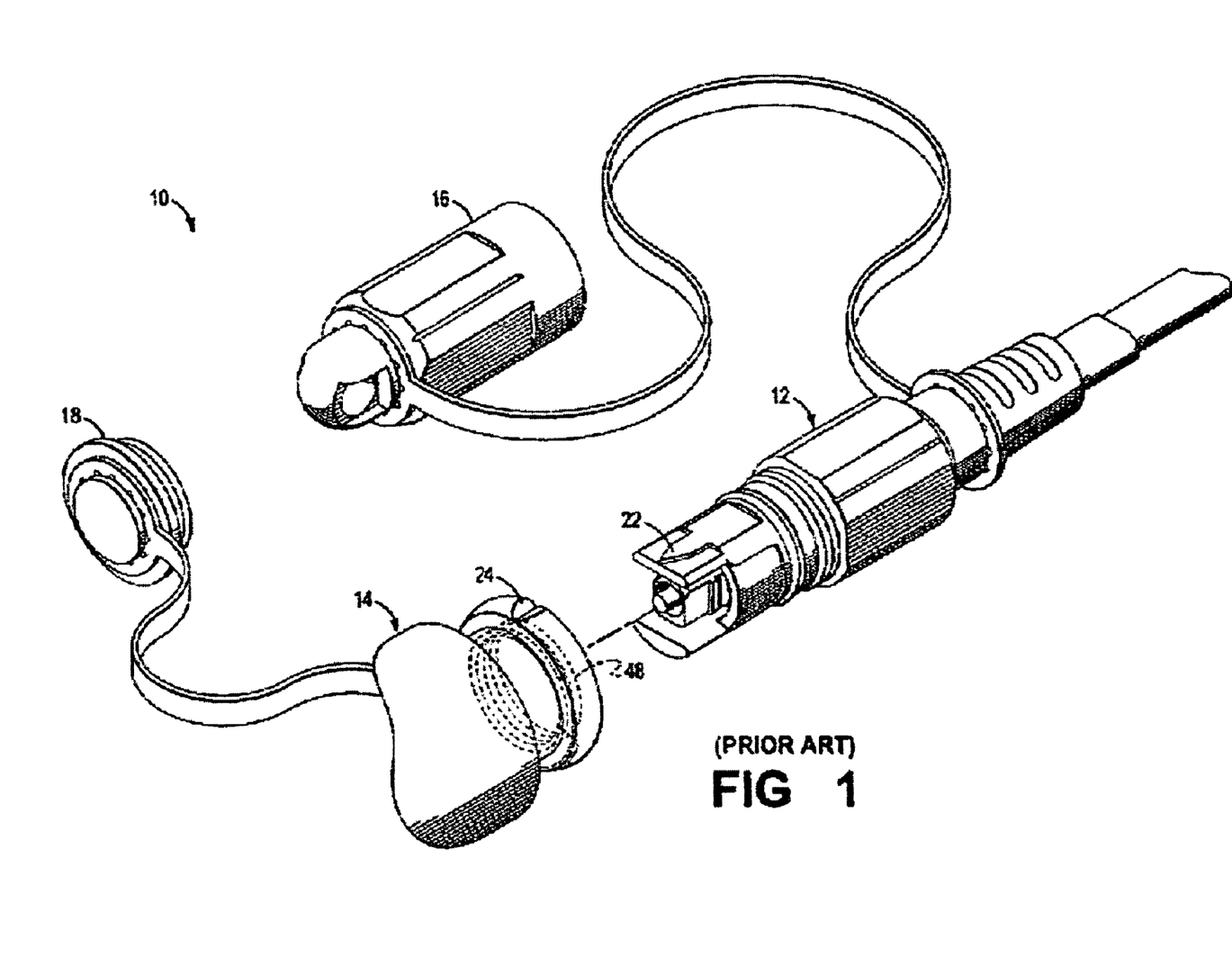
FIG. 1 is a simplified, perspective view of a conventional hardened optical connector system.

Referring now to FIG. 1, shown is a simplified, perspective view of a conventional hardened optical connector system 10, in which a first optical fiber connector or connector plug 12 is to be interconnected to a second optical fiber connector or other appropriate optical component (not shown) via an adapter (not shown). The adapter, which typically is pre-installed in a fiber terminal in many hardened connector system arrangements, typically is formed by a jack receptacle 14 placed back to back with a behind-the-wall receptacle (not shown) designed to accept a non-hardened, behind-the-wall version of the optical connector. The connector 12 can have a protective dust cap 16 that is removable to allow the connector to be inserted into the jack receptacle 14. The jack receptacle 14 also can have a protective dust cap 18 that is removable to allow the connector 12 to be inserted in the jack receptacle 14.

The conventional hardened optical connector 12 can include a key 22 or other alignment indicia, and the jack receptacle 14 can include a complementary or mating keyway 24 or other suitable complementary alignment indicia. Accordingly, when the connector 12 is inserted into the jack receptacle 14, the key 22 and the mating keyway 24 properly orient the connector 12 with respect to jack receptacle 14. The key 22 also prevents the connector 12 from being inserted into a jack receptacle that does not have the appropriate complementary or mating keyway formed therein.

Figure 2:
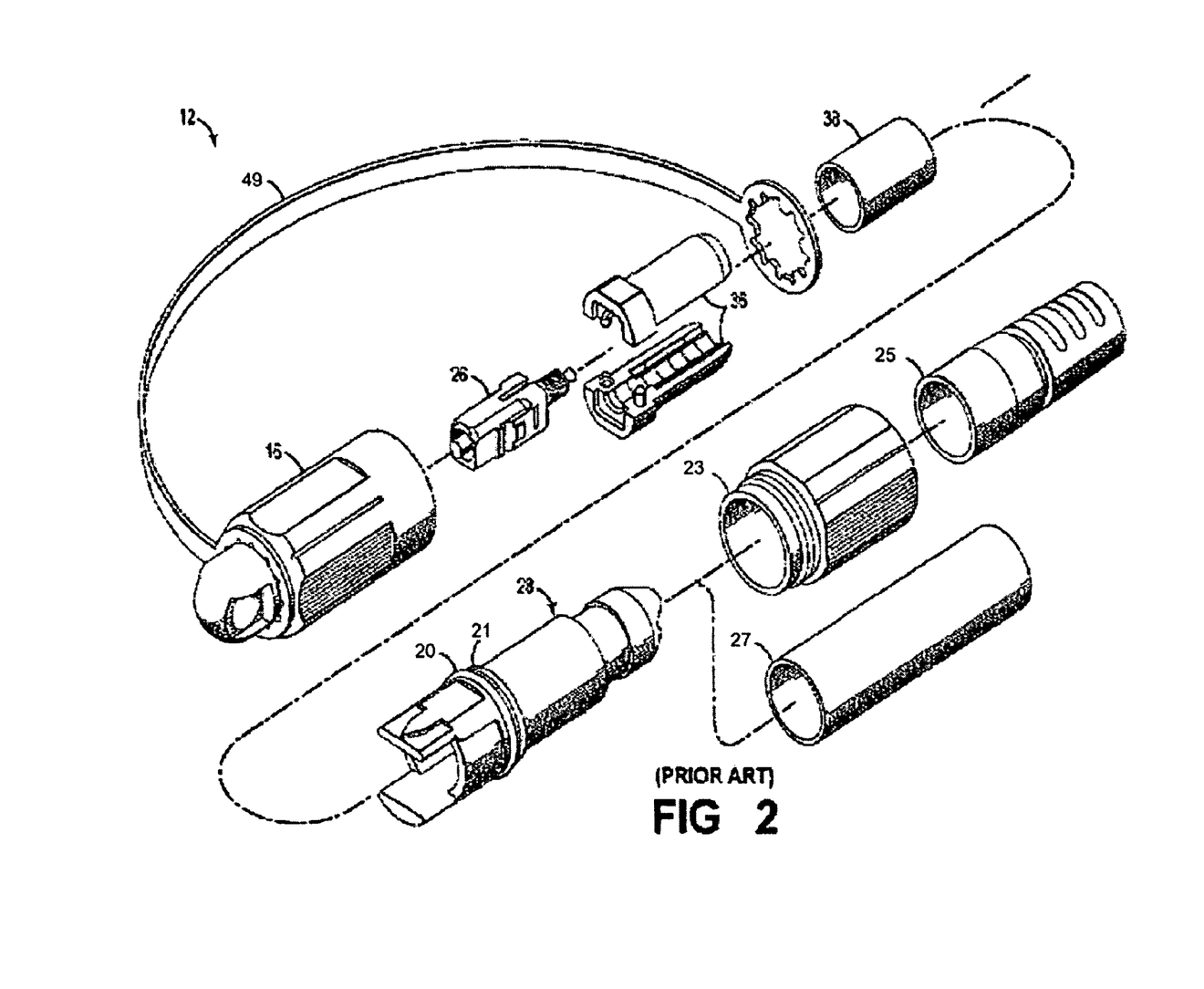
FIG. 2 is an exploded, perspective view of the conventional hardened optical connector in FIG. 1.

Referring now to FIG. 2, with continuing reference to FIG. 1, shown is an exploded, perspective view of the conventional hardened optical connector 12 in FIG. 1. The connector 12 includes an industry standard SC type connector or connector plug 26. The connector plug 26 includes a connector body having therein a ferrule (not shown) in a ferrule holder (not shown), a spring (not shown) and a spring push (not shown). The connector plug 26 is enclosed in a pronged plug housing 28, which is fitted with two O-rings 20, 21.

The connector 12 also includes a two-piece crimp body or assembly 36, which forms around the connector plug 26, and a crimp band or tube 38. The retention of the optical fiber cable within the connector 12 is achieved by sandwiching and bonding the connector plug 26 within the crimp body 36, along with the cable's strength members (not shown), and then crimping the crimp band 38 into place over the crimp body 36. The crimp body 36 then is pushed into the housing 28. The crimp body 36 is configured for securing the cable within the connector 12, once the heat shrink 27 is shrunk into place at the back of the housing 28. The heat-shrink tubing 27 also is used over an appropriate portion of the connector 12 and the cable to prevent water from entering the plug housing 28. The connector 12 also includes a coupling or coupling nut 23 for coupling the connector 12 to the adapter jack receptacle 14. The connector 12 also can include a cable boot 25, which provides strain relief. A lanyard 49 also can be used to secure the protective dust cap 16 to the connector 12.

When the connector 12 is inserted into the adapter, the O-rings 20, 21 are compressed against the relatively smooth, interior walls of the adapter to provide a water tight seal between the connector 12 and the adapter. The adapter uses an O-ring to provide a water-tight seal against a panel or enclosure wall, e.g., the wall of the fiber terminal. The coupling 23 couples the connector 12 and the adapter by screwing the threaded end of the coupling 23 into the threaded end portion of the adapter jack receptacle 14 (shown as 48 in FIG. 1).

As discussed hereinabove, although the conventional hardened connector system 10 is relatively popular, its outer diameter makes it relatively difficult to pull through many conduit used in many outside plant deployments, such as within MDU applications. For example, the outer diameter of the conventional hardened connector system 10 typically is approximately 0.80 of an inch. Thus, the conventional hardened connector system 10 can not be pulled through widely deployed 0.75 inch ANSI Schedule 40 conduit. Nor can the conventional hardened connector system 10 be inserted through many of the holes drilled in building walls, e.g., in MDU applications, since most of the drilled holes have a maximum diameter of approximately 0.5 of an inch.

Figure 3:
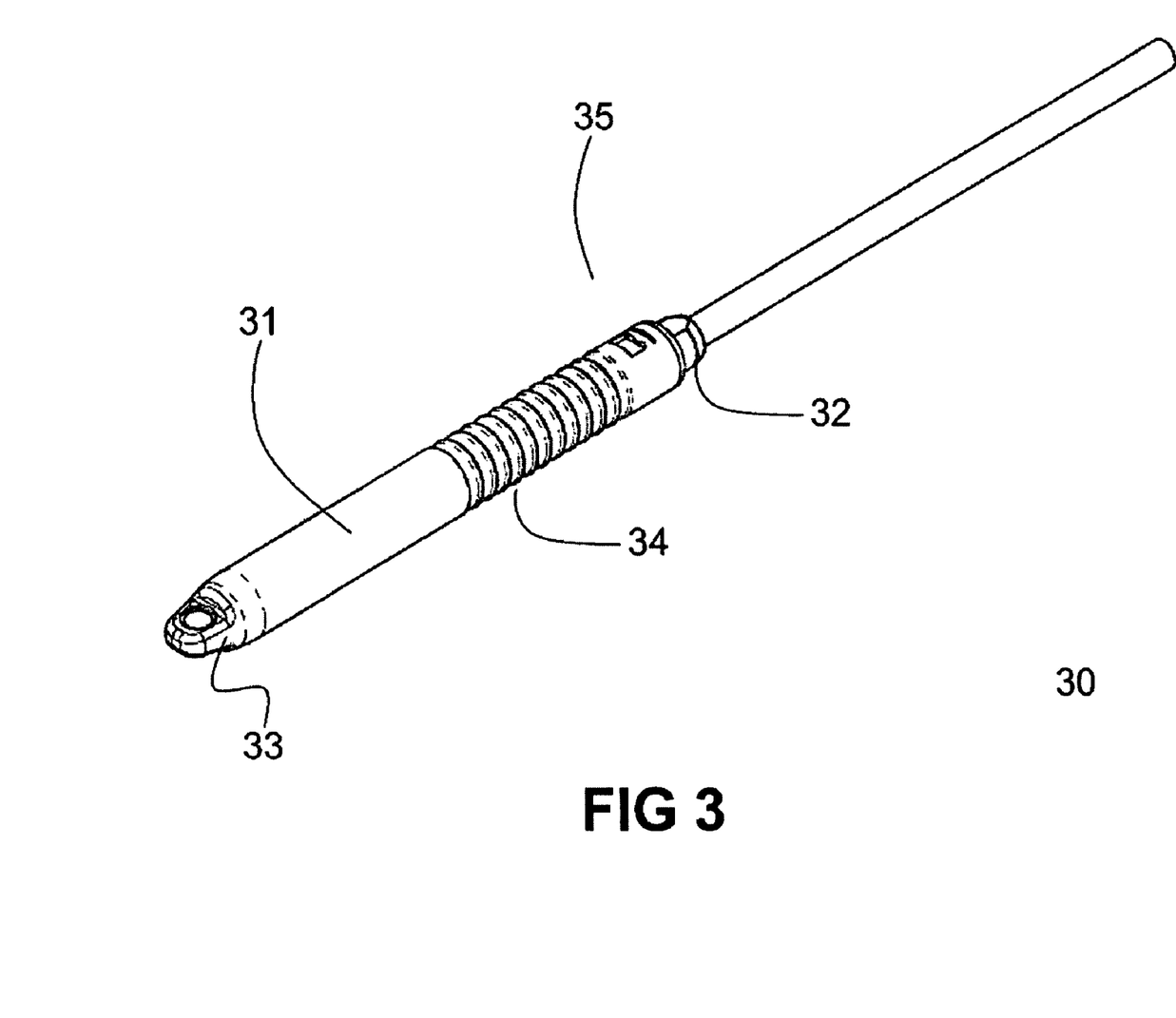
FIG. 3 is a simplified, perspective view of a connector system according to an embodiment of the invention.

Referring now to FIG. 3, shown is a simplified, perspective view of a connector system 30 according to an embodiment of the invention. Compared to conventional hardened connector systems, such as the connector system 10 shown in FIG. 1 and FIG. 2, the connector system 30 is smaller and has relatively simple configuration. The connector system 30 includes a connector-cover 35 which include a cap 31 and an adapter 32. The cap 31 includes a pulling eye 33 at the proximal end of the cap 31 and incorporates multiple annular grooves or bellows features 34 in at least a part of outside surface, the grooves 34 facilitate the controlled bending of the connector-cover 35 and corresponding bending of a fiber optic connector boot (not shown) when the connector and cover is pulled through conduit bends, elbows and other conduit fittings. The shape of the connector-cover 35 is purposely tapered and of a round profile to improve the ease of pulling the connector and connector covers though the conduit and/or conduit restrictions.

Figure 4:
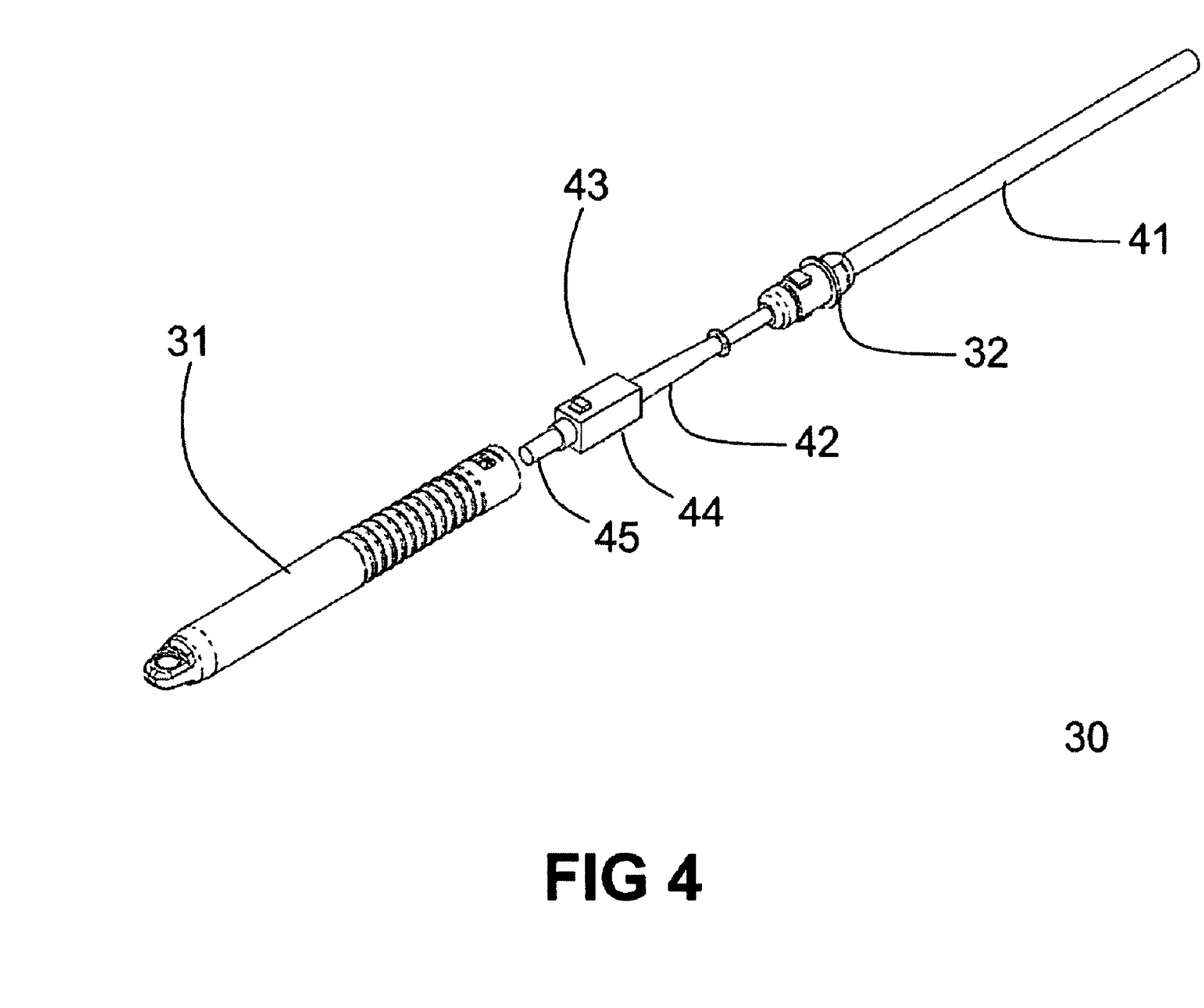
FIG. 4 is a partially exploded view of the connector system according to an embodiment of the invention.

Referring now to FIG. 4, shown is a partially exploded view of the connector system 30 according to an embodiment of the invention. In this figure, the cap 31 is disconnected from the adapter 32 to explore the inside of the connector system 30. The adapter 32 covers a cable 41 having a boot 42 of a connector 43. The boot 42 provides strain relief to the cable 41. The connector 43 can be any industry standard optical connectors such as a SC, LC, MPO or MPX connector. Generally the connector 43 includes a housing 44 having therein a ferrule 45 in a ferrule holder (not shown), a spring (not shown) and a spring push (not shown). The connector 43 is terminated onto a single-fiber cable, e.g., in a conventional manner. However, one or more of the strength members and/or yarns (not shown) within the fiber cable can be crimped onto the connector 43 to improve or strengthen the termination of the connector 43 to the cable 41. The adapter 32 remains with the connector 43 after the connector 43 is connected to a receptacle. The adapter 32 serves the multiple purpose of being an additional strain relief and environmental water seal protection for the service life of the cable 41.

Figure 5:
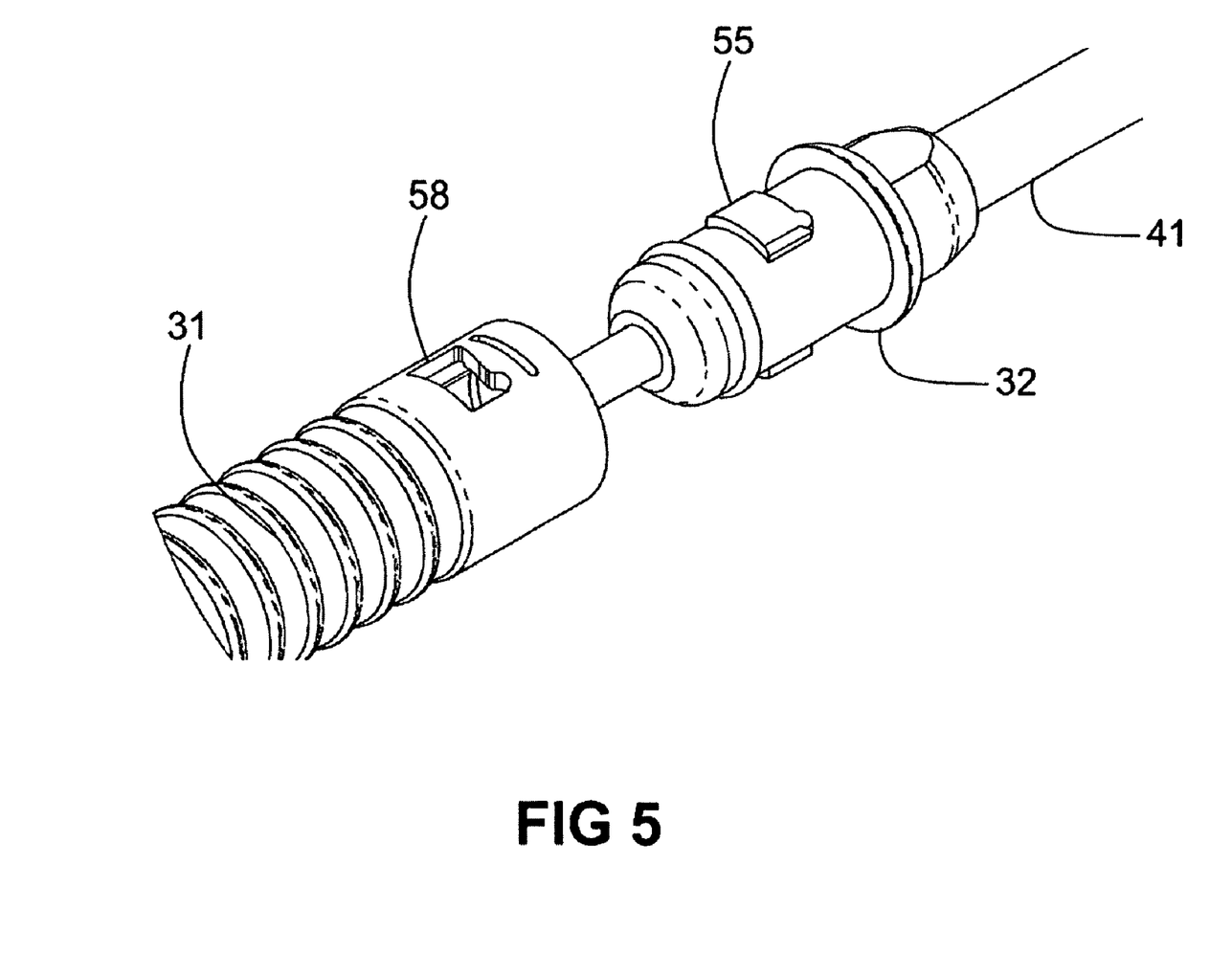
FIG. 5 is a closed up view of partially exploded connector system according to an embodiment of the invention.

Referring now to FIG. 5, shown is a closed up view of a partially exploded connector system 30 according to an embodiment of the invention. In this figure, the cap 31 is disconnected from the adapter 32 to explore one of the connection mechanisms for the connector system 30. In this particular embodiment, a keying feature was employed. The cap 31 can be configured to include one or more keyways 58 or other alignment indicia for connecting the cap 31 to the adapter 32. The adapter 54 also can include one or more corresponding keys 55 or other alignment indicia, which mate with complementary keyways 58 on the cap 31. The key-keyway relationship can be vice-versa. (i.e. the cap can be configured to include key(s) and the adapter can include keyway(s)). The cap 31 is rotated clockwise until the keyway(s) 58 on the cap 31 matches with the corresponding key(s) 55 on the adapter 32.

Figure 6:
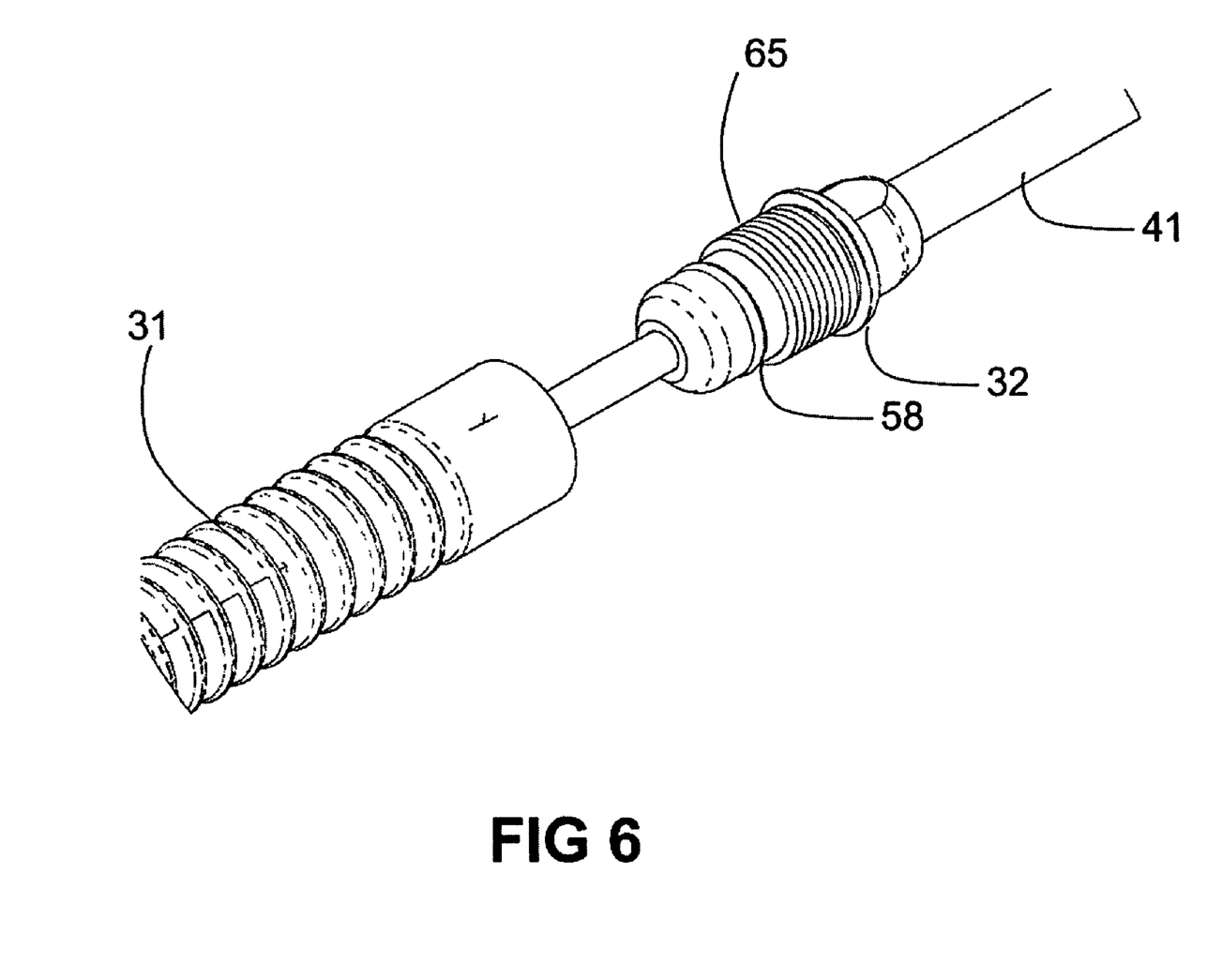
FIG. 6 is another closed up view of partially exploded connector system according to an embodiment of the invention.

Referring now to FIG. 6, shown is another closed up view of a partially exploded connector system 30 according to an embodiment of the invention. In this figure, the cap 31 is disconnected from the adapter 32 to explore one of the connection mechanisms for the connector system 30. In this particular embodiment, a threading feature was employed. The cap 31 can be configured to include one or more thread (not shown) or other alignment indicia for connecting the cap 31 to the adapter 32. The adapter 32 also can include one or more corresponding threading 65 or other alignment indicia, which mate with complementary thread (not shown) on the cap 31. The cap 31 is rotated clockwise until the cap 31 no longer rotate clockwise. Optionally, one or more O-rings 58 can be placed on one or more O-ring grooves (not shown) at proximal end of the adapter 32 prior to the corresponding threading 65.

In the embodiments described above, the outer cylindrical circumference smooth surface of the adapter 32 is directly contacting the inner cylindrical circumference surface of the cap 31. This mating fit dimensionally is an interference fit of approximately 0.010 inches.

Figure 7:
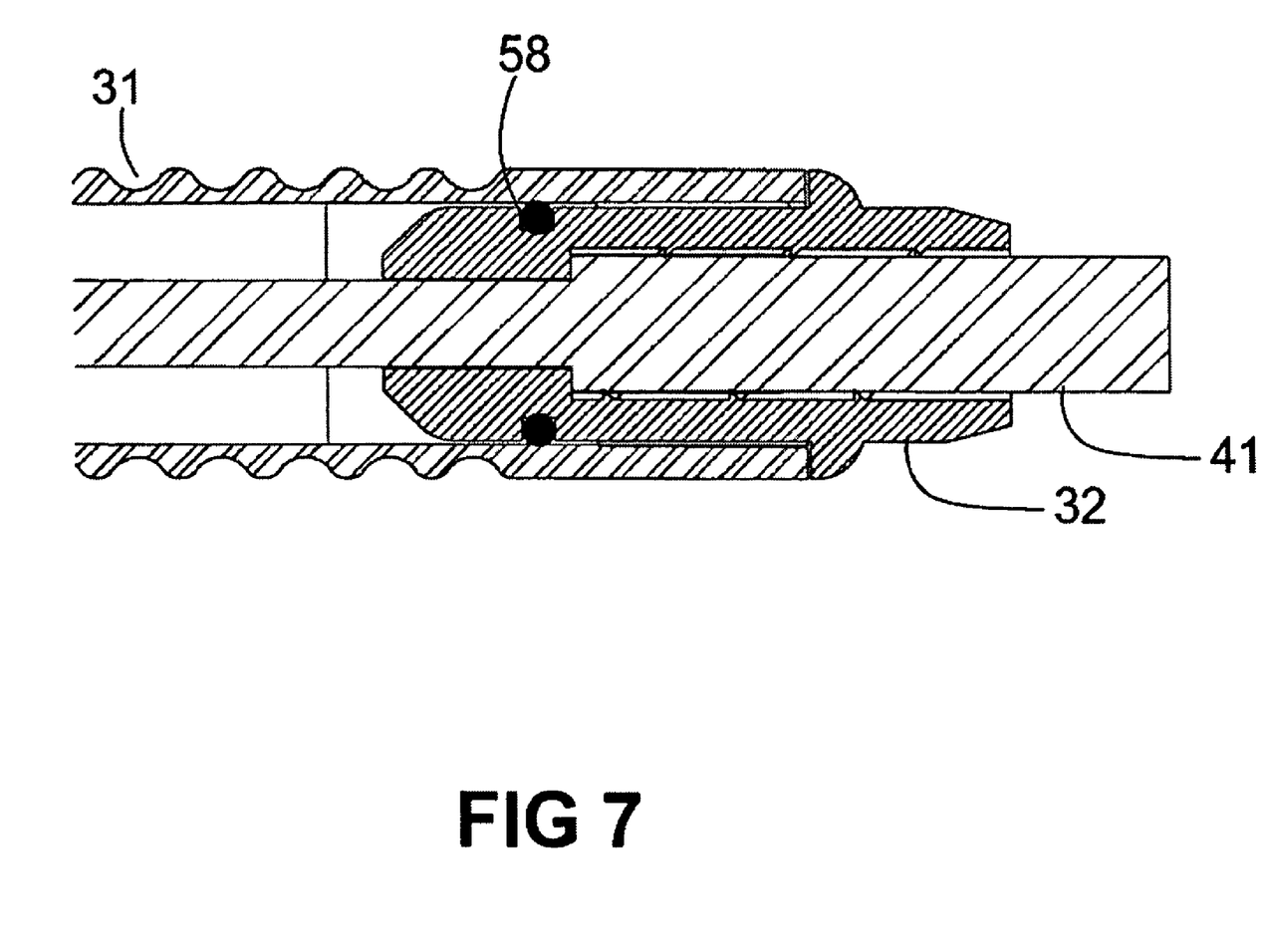
FIG. 7 is a closed up cross-sectional view of the connector system according to an embodiment of the invention.

Alternatively, as described in FIG. 7, the connector-cover can be mechanically sealed by the use of one or more mating O-rings (approximately 0.04" cross section each) assembled on to O-Ring groove on the adapter 32. The mating fits seals against the inner circumference of the cap 31.

The connector-cover 35, the outer jacket 73 of the cable 41 and connector cap 31 may also be additionally secured and environmentally sealed by the use of an epoxy, isoacrylate or urethane adhesive.

Also, it will be apparent to those skilled in the art that other methods to connect a cap and an adapter can be made to the embodiments of the invention, such as mechanical latching approach, herein described without departing from the spirit and scope of the invention as defined by the appended claims and their full scope of equivalents.

Figure 8:
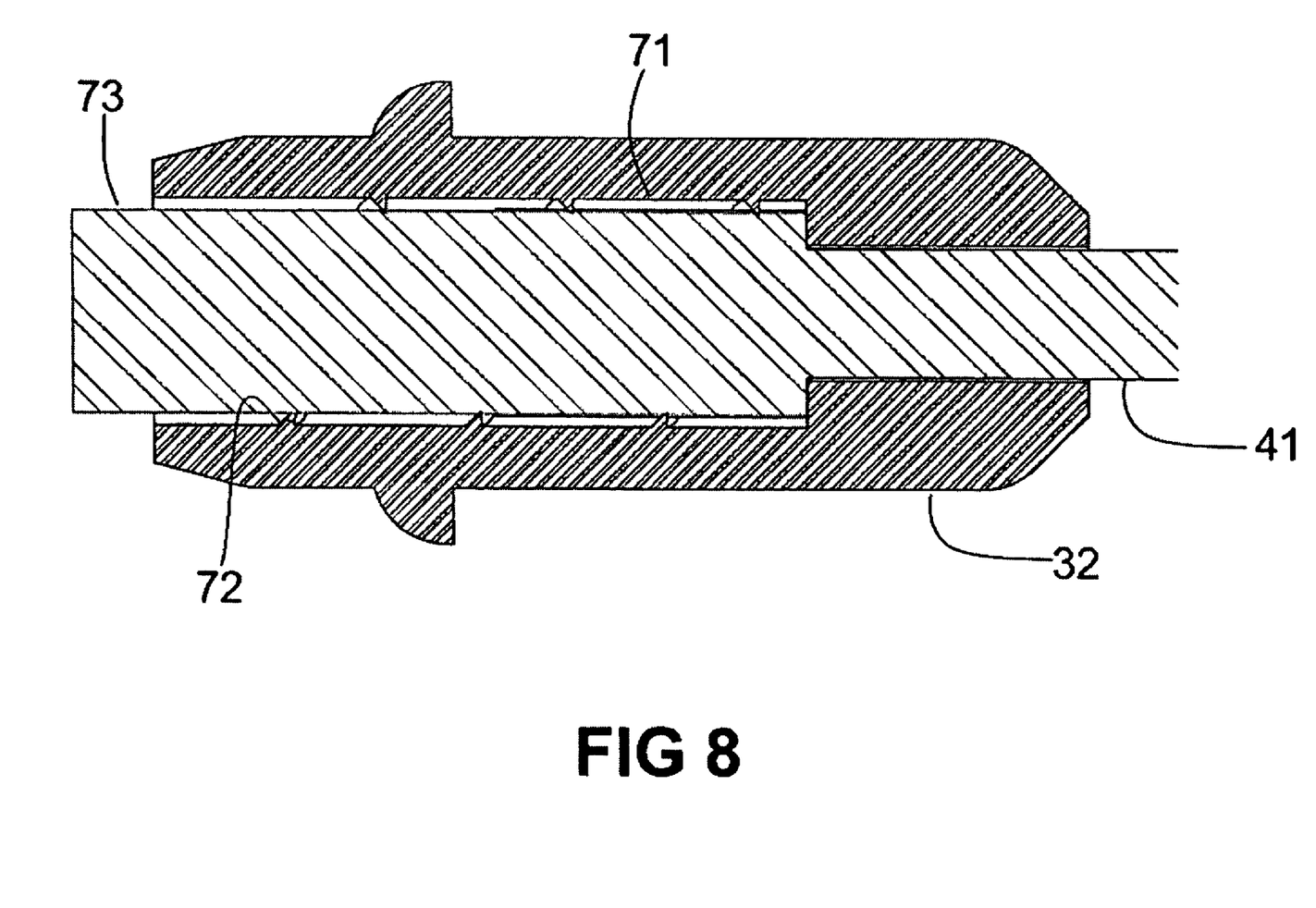
FIG. 8 is a cross-sectional view of an adapter in the connector system according to an embodiment of the invention.

Referring now to FIG. 8, shown is a cross-sectional view of the adapter 32 in the connector system 30 according to an embodiment of the invention. The adapter 32 includes at least a portion of an interior surface 71 having an inner threading feature 72 to connect to the outer jacket 73 of the cable 41. The inner threading feature 72 is for locking the cable jacket 73 in place and resist pulling forces. The fastening includes both to the thermoplastic jacket (or the outer jacket 73) and to a fiber optic Kevlar (not shown) strands embodied inside the outer jacket 73. The Kevlar is a structural part of the fiber optic cables to reinforce the cable to resist tensile pulling forces during the installation of fiber optic cables through conduit and other building environments.

Also, it will be apparent to those skilled in the art that other methods to connect a an adapter and a cable can be made to the embodiments of the invention, such as crimping an adapter and a cable with metal ring, herein described without departing from the spirit and scope of the invention as defined by the appended claims and their full scope of equivalents.

The configuration of the connector system 30 is such that the outer diameter of the cap 31 is less than the outer diameter of conventional hardened connectors. For example, the outer diameter of the cap 31 is approximately less than 0.5 of an inch. Accordingly, as discussed hereinabove, the connector system 30 can be pulled through Schedule 40 (0.75 inch) conduit, e.g., using the pulling eye 33. Also, for example, the connector system 30 can be inserted through 0.5 inch holes drilled into an end user residence, e.g., for deploying the connector system 30 in MDU applications.

The connector system 50 is configured to be deployed within many cables and cable configurations. For example, the connector system 30 is particularly well suited to be deployed in cables with 900 micron fiber and aramid yarn, including polyaramid yarn. The aramid yarn provides an installer or cable manufacturer with something to crimp to and is water swellable. The 900 micron fiber is compatible with many existing connector components.

With respect to the connector-cover 35 of the connector system 30, in general, it is beneficial for the connector-cover 35 (i.e. the cap 31 and the adapter 32) to be relatively tight and relatively stiff. In such case, when the connectorized cable is put under strain, a relatively stiff connector-cover can move the strain into the cable jacket to relieve strain, while a relatively flexible (non-stiff) one could buckle and damage the fiber. Relatively stiff connector-cover material can be made of any suitable material or materials, such as such as nylon (polyamide) 11/12 or polyolefin (e.g. polypropylene or polyethylene). The nylon 11 and 12 have low moisture absorption and lower modulus (improved flexibility) than other nylons. Alternatively, relatively stiff buffer material can be made of straight nylon, Hytrel polyester, and other similar compounds.

It will be apparent to those skilled in the art that many changes and substitutions can be made to the embodiments of the invention herein described without departing from the spirit and scope of the invention as defined by the appended claims and their full scope of equivalents.

What is claimed is:

1. A connector-cover comprising:
   an adapter having an interior threading feature for securely coupling to a cable and a threading feature formed therein; and
   a cap having a first end, a second end, and a surface having a threading feature that mates with the threading feature formed in the adapter;
   the first end being configured to include a pulling eye; and
   the second end being configured to attach to the adapter, wherein a closed space within the cap is created when the cap is securely attached to the adapter, wherein the connector-cover is made from nylon or polyolefin and dimensioned to cover an optical connector plus a length of optical cable, the connector-cover being generally smooth in the region enclosing the optical connector but including multiple annular grooves in the region enclosing the optical fiber in order to protect the optical connector while enabling controlled bending of the connector-cover when pulled through conduit bends.

2. The connector-cover in claim 1, wherein the adapter includes at least one O-ring groove to adapt at least one O-ring such that the O-ring fits seals against the inner circumference of the cap.

3. The connector-cover in claim 1, wherein the cable has an outer jacket.

4. The connector-cover in claim 1, wherein the outside diameter of the connector-cover cross section is approximately less than 0.5 inches.

5. The connector-cover in claim 1, wherein the polyolefin is polypropylene or polyethylene.

6. The connector-cover in claim 1, wherein the optical connector is a SC, LC, MPO or MPX connector.

* * * * *